US010484458B2

(12) United States Patent
DuBois

(10) Patent No.: US 10,484,458 B2
(45) Date of Patent: Nov. 19, 2019

(54) SYSTEM AND METHOD FOR LAUNCHING AN APPLICATION PROGRAM UPON ASSOCIATION OF A MOBILE COMPUTING DEVICE WITH A LOCAL AREA NETWORK

(71) Applicant: FUJIFILM North America Corporation, Valhalla, NY (US)

(72) Inventor: Charles L. DuBois, Rochester, NY (US)

(73) Assignee: FujiFilm North America Corporation, Valhalla, NY (US)

( * ) Notice: Subject to any disclaimer, the term of this patent is extended or adjusted under 35 U.S.C. 154(b) by 174 days.

(21) Appl. No.: 13/840,972

(22) Filed: Mar. 15, 2013

(65) Prior Publication Data

US 2014/0268205 A1    Sep. 18, 2014

(51) Int. Cl.
*H04L 29/08* (2006.01)
*H04L 12/58* (2006.01)
*G06F 3/12* (2006.01)
*H04L 12/911* (2013.01)

(52) U.S. Cl.
CPC ............ *H04L 67/10* (2013.01); *G06F 3/1203* (2013.01); *G06F 3/1236* (2013.01); *G06F 3/1285* (2013.01); *G06F 3/1292* (2013.01); *H04L 47/70* (2013.01); *G06F 3/1225* (2013.01)

(58) Field of Classification Search
CPC .... G06F 3/1285; G06F 3/1292; G06F 3/1201; G06F 3/1202; G06F 3/1203; G06F 3/1204; G06F 3/1236
See application file for complete search history.

(56) References Cited

U.S. PATENT DOCUMENTS

| | | | |
|---|---|---|---|
| 6,434,530 B1 | 8/2002 | Sloane et al. | |
| 6,587,835 B1 | 7/2003 | Treyz et al. | |
| 6,914,694 B1* | 7/2005 | Ichikawa et al. | 358/1.15 |
| 7,155,210 B2 | 12/2006 | Benson | |
| 7,819,315 B1 | 10/2010 | Pienkos | |
| 7,963,441 B2 | 6/2011 | Emmons et al. | |
| 9,081,533 B1* | 7/2015 | West | G06F 3/1272 |
| 2002/0138345 A1 | 9/2002 | Dickson et al. | |
| 2002/0184305 A1* | 12/2002 | Simpson et al. | 709/203 |
| 2006/0031407 A1* | 2/2006 | Dispensa | H04L 29/12009 709/219 |

(Continued)

*Primary Examiner* — Moustafa M Meky
(74) *Attorney, Agent, or Firm* — Dennis B. Danella, Esq.; Wood Oviatt Gilman LLP

(57) ABSTRACT

A system and method for launching an application program stored in a memory of a mobile computing device when the mobile device is associated with a local area network (LAN) is provided. The method may be programmed for execution in a computing environment, wherein the method comprises: providing a local area network; allowing the mobile computing device to associate with the local area network; providing a web page for display on the mobile computing device including terms and conditions of use of the local area network; allowing for the acceptance of the displayed terms and conditions of use of the local area network using the mobile computing device; providing for the detection of the application program in the memory of the mobile computing device; and if the application program is detected in the memory of the mobile computing device, launching the application program on the mobile computing device.

24 Claims, 7 Drawing Sheets

(56) References Cited

U.S. PATENT DOCUMENTS

| | | |
|---|---|---|
| 2007/0086764 A1 | 4/2007 | Konicek |
| 2007/0169205 A1* | 7/2007 | Davison et al. ............... 726/28 |
| 2009/0012704 A1 | 1/2009 | Franco et al. |
| 2010/0095359 A1* | 4/2010 | Gordon ............................ 726/6 |
| 2011/0167166 A1* | 7/2011 | Chang .................. G06F 13/385 |
| | | 709/230 |
| 2011/0205379 A1 | 8/2011 | Konicek |
| 2012/0324011 A1* | 12/2012 | Shepherd et al. ............ 709/204 |
| 2014/0063311 A1* | 3/2014 | McCauley et al. ...... 348/333.01 |
| 2014/0132982 A1* | 5/2014 | Neville et al. ............... 358/1.15 |
| 2014/0218759 A1* | 8/2014 | Pridmore ........... G03G 15/5075 |
| | | 358/1.15 |

\* cited by examiner

SYSTEM AND METHOD FOR LAUNCHING AN APPLICATION PROGRAM UPON ASSOCIATION OF A MOBILE COMPUTING DEVICE WITH A LOCAL AREA NETWORK

FIELD OF THE INVENTION

The present invention generally relates to a system and method for launching an application program upon association of a mobile computing device with a local area network, such as a WiFi network; in particular, the system and method launches an application program stored on a mobile computing device after the computing device joins a particular local area network (LAN) and accepts the respective terms and conditions. In one aspect, the launched application program may be related to the business entity that provides the local area network so that the business entity can provide content on the application program related to the business entity and/or the geographic area in which the local area network services.

BACKGROUND OF THE INVENTION

The use of mobile computing devices, such as smart phones, tablets, and laptops, has become commonplace to accomplish routine daily tasks. For example, these devices are used for communicating with others by email or texting, obtaining information from the Internet, and even ordering items from online retailers. In order to perform these tasks, the mobile computing device is wired or wirelessly connected to a wide area network (WAN) or a local area network (LAN). One method of enabling a computing device to wirelessly exchange data with third parties and connect to the Internet over a local area network is through a WiFi connection.

Many organizations, such as coffee houses, department stores, and hotels, provide their customers with wired or wireless access to their local area network. When providing access to this local area network, typically through a WiFi connection, these business entities leverage techniques to authenticate users and present them with terms and conditions of service on their mobile computing device prior to enabling unabated general access to Internet resources. The process of presenting terms and conditions on a WiFi network prior to allowing a user to access the network is often referred to as a "captive portal." After being directed to the terms and conditions using a captive portal, each user must acknowledge the terms and conditions of service by taking some affirmative action using the mobile computing device before network access is granted, for instance, clicking on an "OK" or "Agree" button in a dialog box or pop-up window displayed after the end of the terms of service.

For example, in order to gain general Internet access in the situation described above, a user would first instruct the mobile computing device to join the specified WiFi network. Rather than enabling all communications and routing Internet traffic, the router associated with the WiFi device providing the local area network operates to redirect all network traffic to its captive portal. The user is presented with the terms and conditions for the WiFi network on a web page through the captive portal. After the terms and conditions are accepted by the user, the user's mobile computing device is remembered by the router and then general access to the Internet is enabled. Thereafter, a landing web page is presented on the mobile computing device welcoming the user to that network.

While the above-referenced process is beneficial in that provides a customer with access to a network when visiting a particular business location, the organization is missing out on an opportunity to convey additional information to the user that may improve the customer experience and potentially increase revenue generation for the organization. What is needed is a system and method that leverages the customer's use of the organization's local area network to improve the customer experience and potentially increase revenue generation for the organization. The present invention fills this need and other needs.

SUMMARY OF THE INVENTION

In one embodiment, in order to overcome the above stated problems, the present invention may include a system for launching an application program stored in a memory of a mobile computing device. For example, the system comprises a local area network device configured for receiving a request to join a network from the mobile computing device and selectively allowing the mobile computing device access to the network. The system further includes a memory, as well as a user agreement module, a detection module, and a launch module stored in the memory. When the local area network device receives the request to join the network, the user agreement module is configured for displaying terms and conditions of use on the mobile computing device and providing the ability for the mobile computing device to accept the displayed terms and conditions. When the terms and conditions are accepted, the detection module is configured for determining if the application program is stored in the memory of the mobile computing device. If the detection module determines that the application program is stored in the memory of the mobile computing device, the launch module is configured for launching the application program on the mobile computing device. On the other hand, if the detection module determines that the application program is not stored in the memory of the mobile computing device, then the system directs the web browser on the mobile computing device to a landing web page.

In another embodiment, the present invention provides a system for launching a photo printing application program stored in a memory of a mobile computing device. The system comprises a local area network device configured for receiving a request to join a photofinisher network from the mobile computing device and selectively allowing the mobile computing device access to the photofinisher network. A photofinisher device is in communication with the photofinisher network, and is configured for receiving a print order from the mobile computing device over the photofinisher network using the photo printing application program and fulfilling the print order utilizing a printing device. Also, the system includes a web application server, as well as a user agreement module, a detection module, and a launch module stored in the web application server. When the local area network device receives the request to join the photofinisher network, the user agreement module is configured for displaying terms and conditions of use on the mobile computing device and providing the ability for the mobile computing device to accept the displayed terms and conditions. When the terms and conditions are accepted, the detection module is configured for determining if the photo printing application program is stored in the memory of the mobile computing device. If the detection module determines that the photo printing application program is not stored in the memory of the mobile computing device, then a web browser of the mobile computing device may be directed to a landing web page hosted by a business entity related to the photofinisher wherein the photo printing application program is offered to the user of the mobile computing device. On the other hand, if the detection module determines that the photo printing application program is stored in the memory of the mobile computing device, the launch module is configured for launching the photo printing application program on the mobile computing device. The photo printing application program is configured for allowing the print order to be generated including a digital photograph selected using the mobile computing device, and the print order is communicated to the photofinisher device over the photofinisher network for generating a print product based upon the digital photograph.

In a further embodiment, the present invention provides a method programmed for execution in a computing environment for launching an application program stored in a memory of a mobile computing device. The method comprises: providing a local area network; allowing the mobile computing device to associate with the local area network; providing a web page for display on the mobile computing device including terms and conditions of use of the local area network; allowing for the acceptance of the displayed terms and conditions of use of the local area network using the mobile computing device; providing for the detection of the application program in the memory of the mobile computing device; and if the application program is detected in the memory of the mobile computing device, launching the application program on the mobile computing device.

In yet another embodiment, the present invention provides a method programmed for execution in a computing environment for launching a photo printing application program stored in a memory of a mobile computing device. The method comprises: providing a local area network in communication with a photofinishing device; allowing the mobile computing device to associate with the local area network; providing a web page for display on the mobile computing device including terms and conditions of use for the local area network; allowing for the acceptance of the displayed terms and conditions of use of the local area network using the mobile computing device; providing for the detection of the photo printing application program in the memory of the mobile computing device; if the photo printing application program is detected in the memory of the mobile computing device, launching the photo printing application program on the mobile computing device; and providing for the generation of a print order including a digital photograph selected using the mobile computing device. Further, the photofinisher device is configured for receiving the print order from the mobile computing device over the local area network and fulfilling the print order utilizing a printing device.

In another embodiment, the present invention provides a system for launching an image/file transfer application program stored in a memory of a mobile computing device. The system comprises a local area network device configured for receiving a request to join a local area network from the mobile computing device and selectively allowing the mobile computing device access to the local area network. The system also includes a web application server, as well as a user agreement module, a detection module, and a launch module stored in the web application server. When the local area network device receives the request to join the local area network, the user agreement module is configured for displaying terms and conditions of use on the mobile computing device and providing the ability for the mobile computing device to accept the displayed terms and conditions. When the terms and conditions are accepted, the detection module is configured for determining if the image/file transfer application program is stored in the memory of the mobile computing device. When the detection module determines that the image/file transfer application program is stored in the memory of the mobile computing device, the launch module is configured for launching the image/file transfer application program on the mobile computing device. The image/file transfer application program is configured for allowing a digital photograph that is stored on the mobile computing device to be communicated to another computing device using the local area network.

In yet another embodiment, the present invention provides a method programmed for execution in a computing environment for launching an image/file transfer application program stored in a memory of a mobile computing device. The method comprises: providing a local area network in communication with a computing device remote from the mobile computing device; allowing the mobile computing device to associate with the local area network; providing a web page for display on the mobile computing device including terms and conditions of use for the local area network; allowing for the acceptance of the displayed terms and conditions of use of the local area network using the mobile computing device; providing for the detection of the image/file transfer application program in the memory of the mobile computing device; if the image/file transfer application program is detected in the memory of the mobile computing device, launching the image/file transfer application program on the mobile computing device; and allowing the mobile computing device to communicate a digital image that is stored on the mobile computing device to the remote computing device using the local area network.

Additional benefits of the above-described system and method for launching an application program stored in a memory of a mobile computing device are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Figure 1:
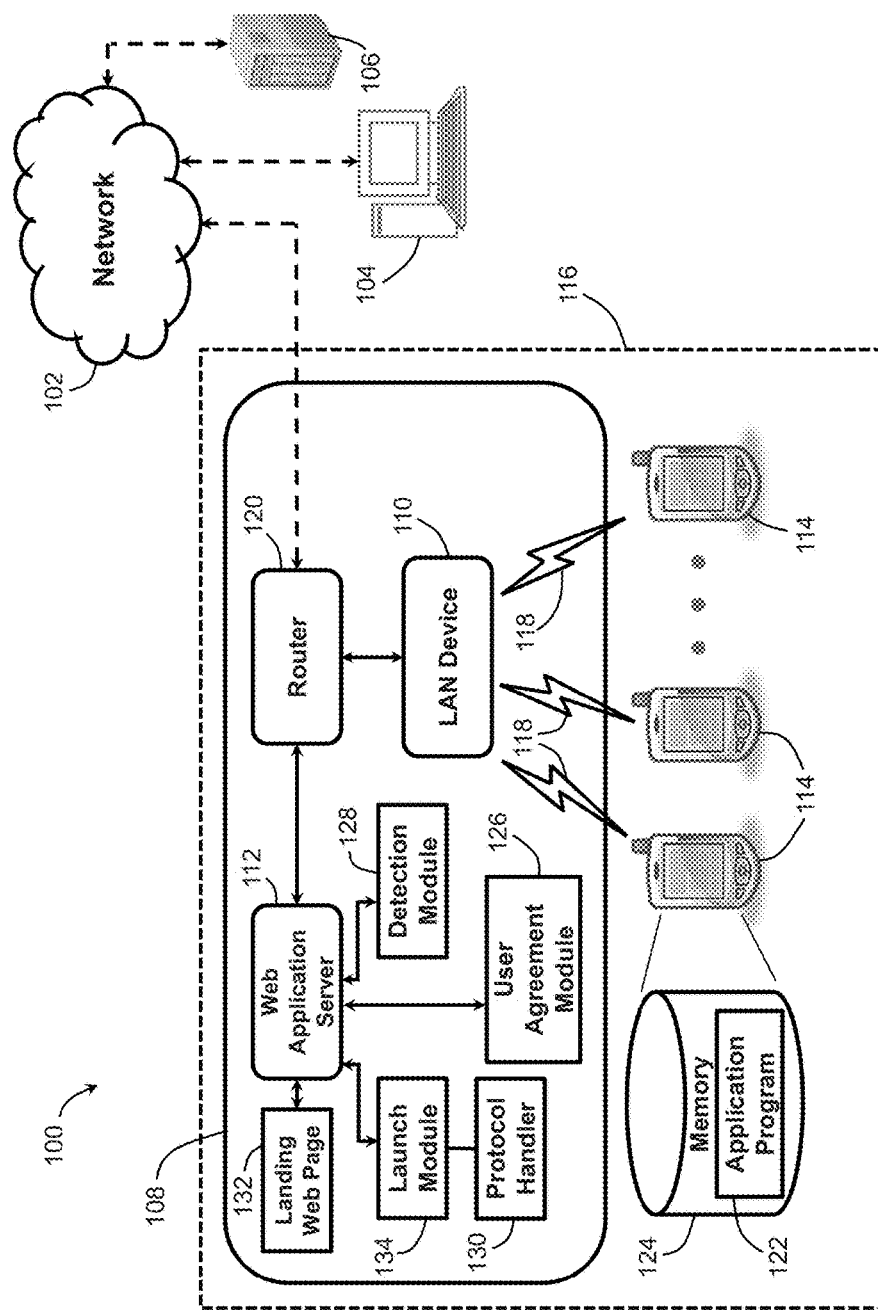
FIG. 1 generally illustrates a networking environment in which the present invention may be implemented according to one aspect of the invention.

Generally, the tools and methods described herein for launching an application program stored in a mobile computing device upon association with a local area network, such as a WiFi network, may be implemented in hardware, software or a combination thereof.

This document is organized as follows: In the first section, an overview of the techniques and implementation is provided and described along with an exemplary network environment. In the next section, the specifics of the work flow and implementation for the application program launch process is discussed, including the operational functions of the present invention. Finally, an exemplary computer environment for the implementation of the invention is described.

Overview of Techniques and Implementations

The present invention provides a system and method that is configured to launch a pre-identified application program (hereinafter "application") stored in a mobile computing device (hereinafter "mobile device") upon associating the mobile device with a local area network (hereinafter "LAN"). The system and method improves the experience of a user of a mobile device upon joining a LAN by automatically launching an application that provides content and/or service offerings (collectively "content") that may be desirable or useful to the user. The application is pre-identified in the sense that it is selected by a business entity or administrator of the LAN as being a desired or relevant application program for someone that would request access to a particular LAN. In one aspect, the content presented by the application may be related to the business entity that is providing access to the LAN, such as the ability to upload digital photographs and order print products, the ability to access a pre-paid account related to the business entity, expedite a checkout process, provide access to coupons, and a map of a store or the general surrounding geographic area. Other types of content provided by the application are also contemplated and within the scope of the present invention. While the present invention relates to the launching of an application upon association of a mobile device with a LAN, it should be understood that the mobile device could also be provided general access to the network after the specified terms and conditions of use are agreed upon by the user of the mobile device.

In particular, a system and method are provided for providing a LAN, such as, for example, a WiFi network, that will allow one or more mobile device to connect to a network, such as the Internet. The mobile device may be a smart phone, tablet, laptop, or any similar type of mobile computing device. The mobile device may communicate with the LAN by either a wired or wireless connection when the mobile device is located in an area that is supported by the LAN. The mobile device may be configured to automatically detect the existence of the LAN or the LAN may need to be manually selected by the user of the mobile device. Once the LAN is recognized and selected by the mobile device, the mobile device is associated with the LAN. In other words, the mobile device has joined the LAN.

Rather than enabling all communications and routing Internet traffic to and from mobile device, a router may be used to redirect the communications of the mobile device through a captive portal. The captive portal directs a web browser of the mobile device to a web page that displays certain terms and conditions of use of the LAN that must be accepted by the user of the mobile device before general network communications through the Internet will be permitted. The terms and conditions of use are the rules proposed by the administrator of the LAN that must be followed by the users of the LAN to ensure that all communications are legal and used for a particular purpose. The terms and conditions of use displayed on the web site are typically followed by a mechanism, for example, a button, that allows a user of a mobile device requesting access to the LAN to accept the terms and conditions of use. These types of agreements are sometimes called a "clickwrap" or "clickthrough" agreement. Once the terms and conditions of use are agreed upon using the mobile device, an identification marker associated with the mobile device is stored in the router so that the mobile device is permitted general access to the Internet through the LAN.

However, prior to providing general Internet access through the LAN using the mobile device, the system and method of the present invention makes a determination as to whether a pre-identified application program can be launched on the mobile device. A mechanism that allows for the launching of the application from the mobile device is a protocol handler, URL handler, or URI handler (hereinafter "protocol handler"). After the terms and conditions of use are accepted using the mobile device, the web page that presented the terms and conditions of use includes a detection code that determines if a protocol handler is supported by the mobile device. If the protocol handler is supported by the mobile device, further detection is utilized to determine if the application is stored in the memory of the mobile device. If the application is not stored in the memory of the mobile device, the web browser of the mobile device is directed to a landing web page of the LAN, wherein the user of the mobile device may be presented with the ability to install the application and thereafter may be provided general access to the Internet. If the application is stored in the memory of the mobile device, the protocol handler is triggered and the application is launched on the mobile device, wherein the mobile device is used to display content specific offers or services, which may relate to the business entity that is providing the LAN.

Having described some base concepts of the invention, aspects of the invention will now be described with reference to the drawing figures. An exemplary environment or system in which the present invention would be applicable is shown in FIG. 1 and is designated as reference numeral 100. System 100 may include a network 102, such as the Internet, or other similar configuration for allowing communication among two or more computing devices. Connected to network 102 may be one or more general purpose computing devices 104, such as, but not limited to, a personal computer, smart phone, or laptop computer, which may be located in a home, office, retail location or other environment, and that provide an interface for user interaction with local or remote applications or systems. A server 106 may also be connected to network 102 to provide any one or more of a variety of functions including serving as a web server, data store, and application server and/or provide other services.

Figure 2:
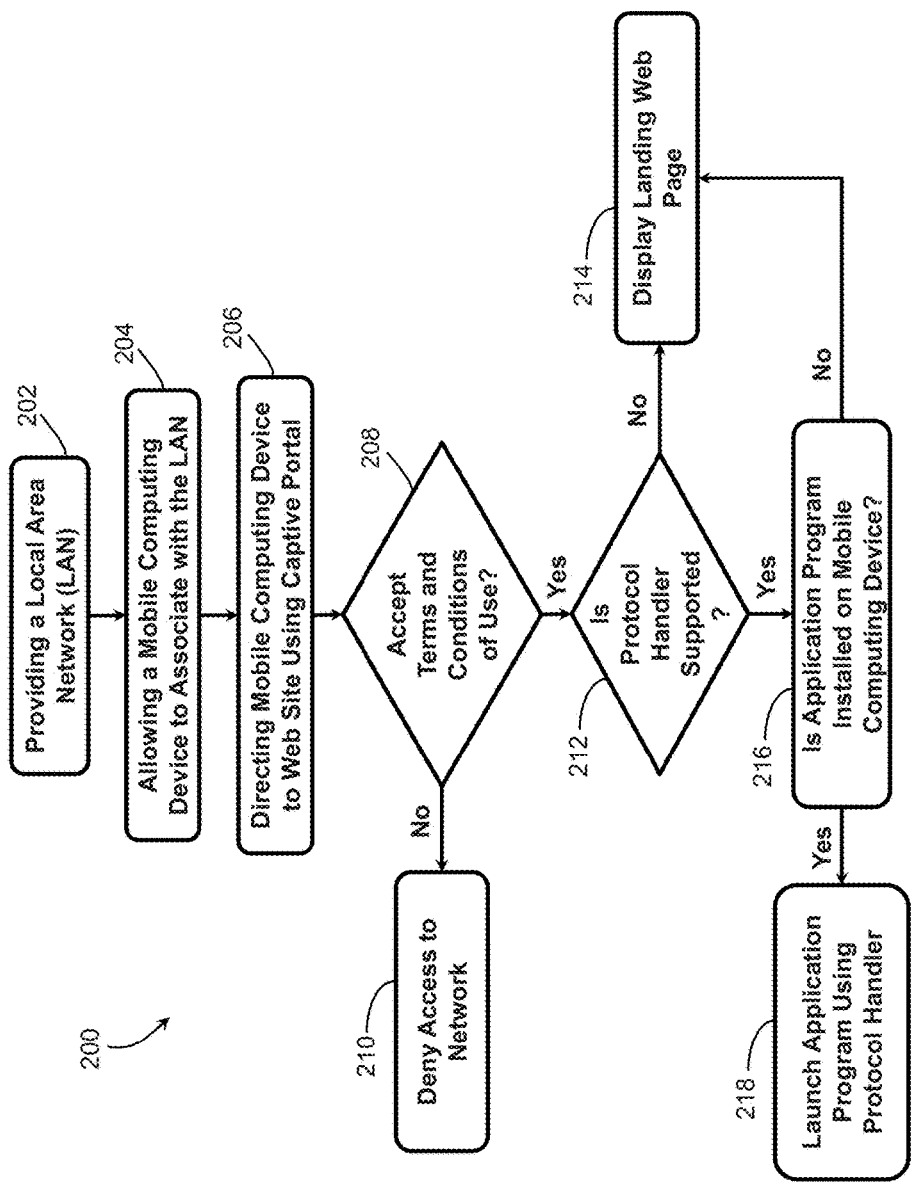
FIG. 2 is a flow diagram showing a method in accordance with the aspect of the present invention shown in FIG. 1.

A business entity computing system 108 may also be remotely located and connected to network 102. Computing system 108 may be operated by a business entity such as, but not limited to, a retail photo finishing lab, coffee house, department store, hotel, museum, library, or mall. The business entity computing system 108 may include a LAN device 110 and a local web application server 112 in addition to other devices for conducting its business operations. Local web application server 112 may include a memory for storing web-related data, modules, and other types of data. A module may include computer code that is configured to perform a certain function in a computer environment. With additional reference to a method 200 set forth in FIG. 2, LAN device 110 provides a LAN network 116 in step 202 that is configured for receiving a request from one or more mobile devices 114 to connect 118 to a LAN network 116. At step 204, LAN device 110 selectively allows the mobile computing device 114 access to network 108 by a wired connection, or a wireless connection, if located within the area covered by LAN network 116. Computing system 108 further includes a router 120 for directing communications between mobile device 114, web application server 112, and the network 102. Furthermore, mobile device 114 may include a pre-identified application program 122 that is stored in a memory 124.

System 100 further includes a user agreement module 126 stored in the memory of web application server 112. When LAN device 110 receives a request to join LAN network 116, user agreement module 126 is configured for displaying terms and conditions of use on a web page accessible by a web browser resident on mobile device 114 through a captive portal, at step 206. User agreement module 126 is also configured at step 208 for providing the ability for mobile device 114 to accept or decline the displayed terms and conditions. Mobile device 114 may be used to accept the terms and conditions of use by clicking an "OK" or "Agree" button, for example. If the terms and conditions of use are declined using mobile device 114, access to networks 102, 116 is denied at step 210.

System 100 further includes a detection module 128 stored in the memory of web application server 112. If the terms and conditions are accepted using user agreement module 126, then detection module 128 is configured for detecting whether mobile device 114 can support a protocol handler 130 at step 212. As mentioned above, protocol handler is also being used to describe a URL handler and a URI handler. If detection module 128 determines that mobile device 114 does not support protocol handler 130, then the web browser is directed to a landing web page 132 at step 214, and mobile device 114 is permitted access to network 102, and general computing devices 104, 106. Landing web page 132 may provide information or a mechanism to allow mobile device 114 to download application program 122. In the alternative, if mobile device 114 supports protocol handler 130 and the terms and conditions are accepted, detection module 128 is configured for determining if application program 122 is stored in the memory of mobile device 114 using a protocol handler 130 at step 216.

System 100 further includes a launch module 134 stored in the memory of mobile device 114 or web application server 112. If detection module 128 determines that mobile device 114 supports protocol handler 130 and application program 122 is stored in the memory of mobile device 114, then launch module 134 is configured for launching application program 122 on mobile device 114 using protocol handler 130 at step 218. The launching of application program 122 may be automatic or require some action on behalf of mobile device 114 or the user of mobile device 114. Launching application program 122 may be customized with features specific to the business entity and/or the location of LAN network 116. After launching application program 122, mobile device 114 is permitted access to network 102, and general computing devices 104, 106.

Figure 3:
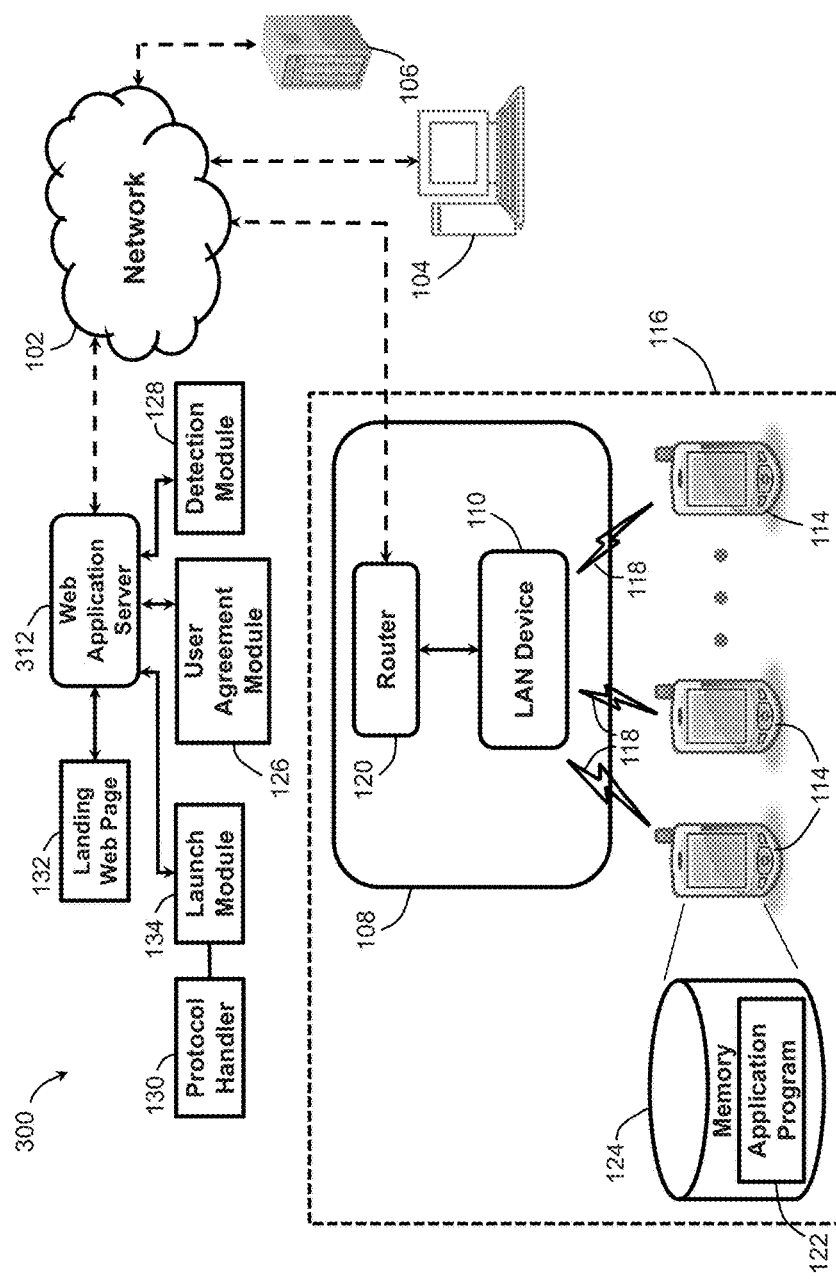
FIG. 3 generally illustrates a networking environment in which the present invention may be implemented according to another aspect of the invention.

As best seen in FIG. 3, the present invention also includes a system 300. All of the components and aspects described above with respect to system 100 also apply to system 300. However, instead of providing local web application server 112, a remote web application server 312 is provided and is in communication with business entity computing system 108 over network 102.

Representative Implementation

The present invention and the advantages thereof can be further appreciated by considering a representative implementation. In the representative implementation, a system and method for launching a pre-identified photo printing application on a mobile device upon associating the mobile device with a photofinisher LAN network hosted by a photo fulfillment center is described in accordance with the present invention and with reference to FIGS. 4 and 5.

In this representative implementation, many of the components previously discussed with respect to system 100 are also used in a system designated with reference numeral 400. These components and their function are similar to those described above with respect to system 100. However, in this implementation, a photofinisher LAN network 416 is hosted by a photo fulfillment center 436. Photo fulfillment center 436 is a business entity that receives print orders, produces a print product 437 using digital photos received by customers, and delivers the end product to the customer. Print product 437 may include such items as a photo print, mug, clothing, such as a T-shirt, key chain, memorabilia, brochure, calendar, catalog, book, blanket, owner's manual or other medium that will present, display or otherwise use a digital photo.

In addition to the components in system 100, system 400 may include a photofinisher device 438, such as a kiosk and/or photo printing systems. Photofinisher device 438 is in communication with photofinisher network 416, and is configured for receiving a print order from mobile device 116 over photofinisher network 416 using a photo printing application program 440 stored in memory 124 of mobile device 114. The print order may include one or more digital photographs 442 that are stored in memory 124 of mobile device 114, and a designation of the type of product to be produced by photo fulfillment center 436. It should be understood that the print order may be stored in a remote photofinisher server 444 or a local photofinisher server included within or in communication with photofinisher device 438.

System 400 further includes a printing device 446 that is used to fulfill the print order received from mobile device 114 and produce print product 437. Printing device 446 may include a large photo format printer, ink jet printers, gift card equipment, content transfer equipment, or other devices for transferring or incorporating digital images onto a variety of mediums by, for example, printing, etching, embossing, and embroidering.

Figure 5:
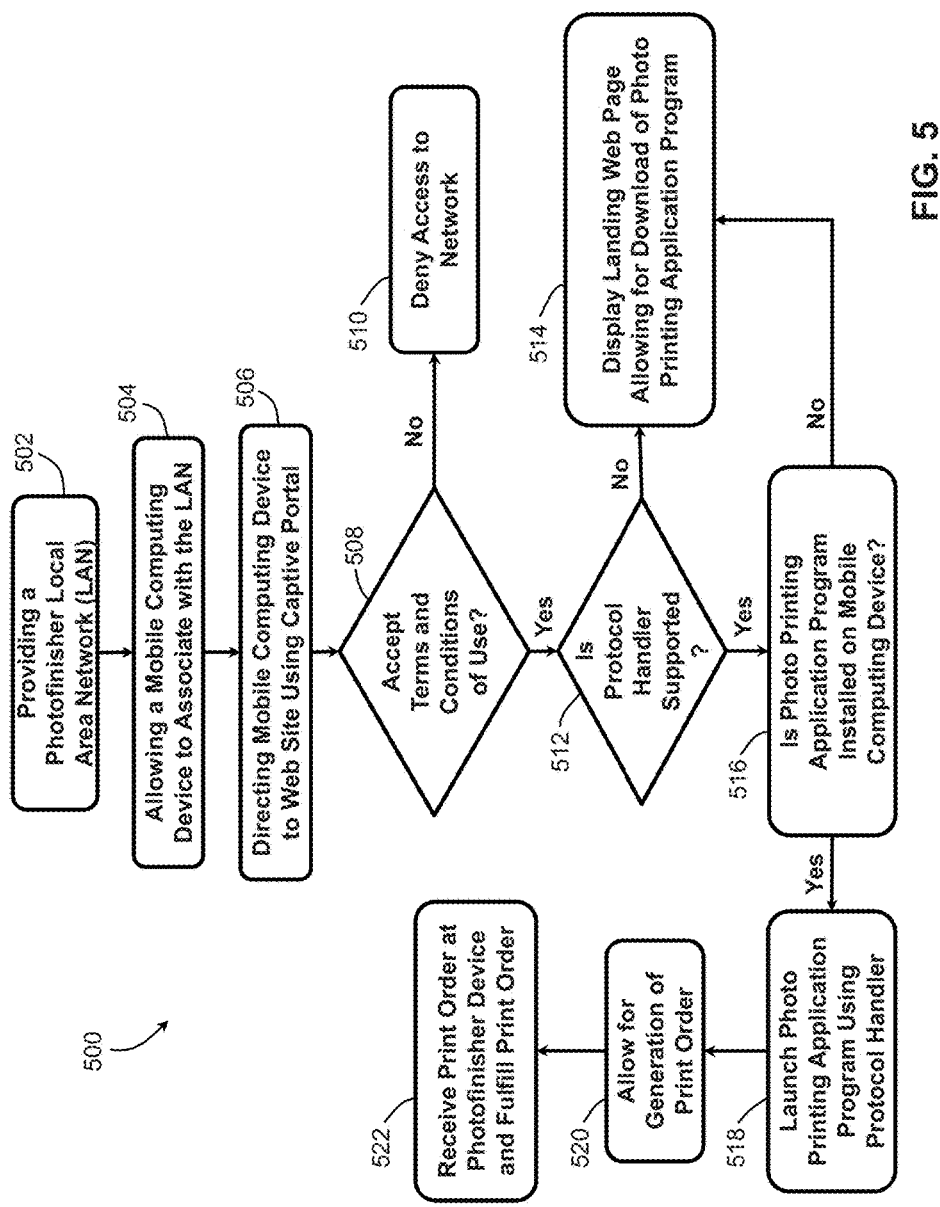
FIG. 5 is a flow diagram showing a method in accordance with the aspect of the invention shown in FIG. 4.

As best seen in FIG. 5, a method 500 for launching photo printing application program 440 stored in memory 124 of mobile device 114 is provided. At step 502, the method provides photofinisher LAN 416 in communication with photofinishing device 438 via router 120. Next, mobile device 114 is allowed to associate with photofinisher LAN 416 using a wired or wireless connection at step 504, and a web page is displayed on the mobile device 114 using a captive portal at step 506. User agreement module 126 is used to display the terms and conditions of use for photofinisher LAN 416 on the web site. User agreement module 126 allows mobile device 114 to be used to accept the terms and conditions of photofinisher LAN 416, at step 508, by clicking an "OK" or "Agree" button, for example. If the terms and conditions of use are declined using mobile device 114, access to networks 102, 416 is denied at step 510.

If the terms and conditions are accepted using user agreement module 126, then detection module 128 is configured for detecting whether mobile device 114 can support protocol handler 130 at step 512. If detection module 128 determines that mobile device 114 does not support protocol handler 130, then the web browser of mobile device 114 is directed to a photofinisher landing web page 432 at step 514, and mobile device 114 is permitted access to network 102, and general computing devices 104, 106. Landing web page 432 may provide information or a mechanism to allow mobile device 114 to download photo printing application program 422. On the other hand, if mobile device 114 supports protocol handler 130 and the terms and conditions are accepted, detection module 128 is configured for determining if photo printing application program 422 is stored in the memory of mobile device 114 using a protocol handler 130 at step 516.

System 400 further includes launch module 134 stored in the memory of mobile device 114 or web application server 112. If detection module 128 determines that mobile device 114 supports protocol handler 130 and photo printing application program 422 is stored in the memory of mobile device 114, then launch module 134 is configured for launching photo printing application program 422 on mobile device 114 using protocol handler 130 at step 518. The launching of photo printing application program 422 may be automatic or require some action on behalf of mobile device 114 or the user of mobile device 114. Launching photo printing application program 422 may be customized with features specific to the photo fulfillment center 436 and/or the location of photofinisher LAN network 416. For instance, photo printing application program 422 could provide the ability to upload digital photographs to photofinisher server 444, generate print orders at step 520, send the print orders to the photofinisher device 438, expedite the checkout process after the print orders are complete, provide a list of available print options to the user, provide special coupon offers for specified print products, and other photo related content. After launching photo printing application program 422, mobile device 114 is permitted access to network 102, and general computing devices 104, 106.

In one embodiment application program 422 may be configured to send information about the user to photofinisher LAN network 416. This information may be used to identify the user, pre-populate form fields, transmit payment information, give location information, and the such.

Figure 4:
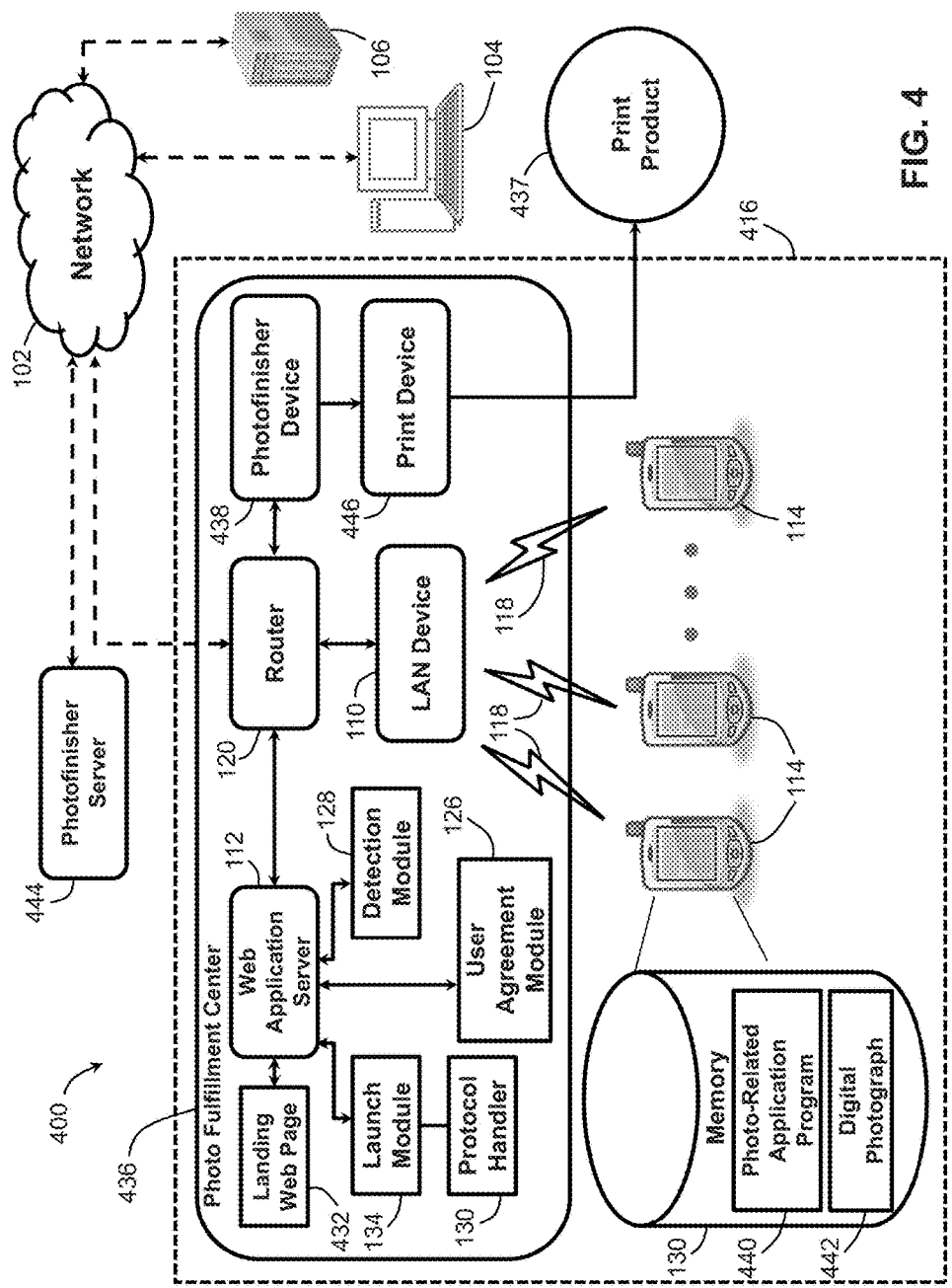
FIG. 4 generally illustrates a networking environment in which the present invention may be implemented according to yet another aspect of the invention.
Figure 6:
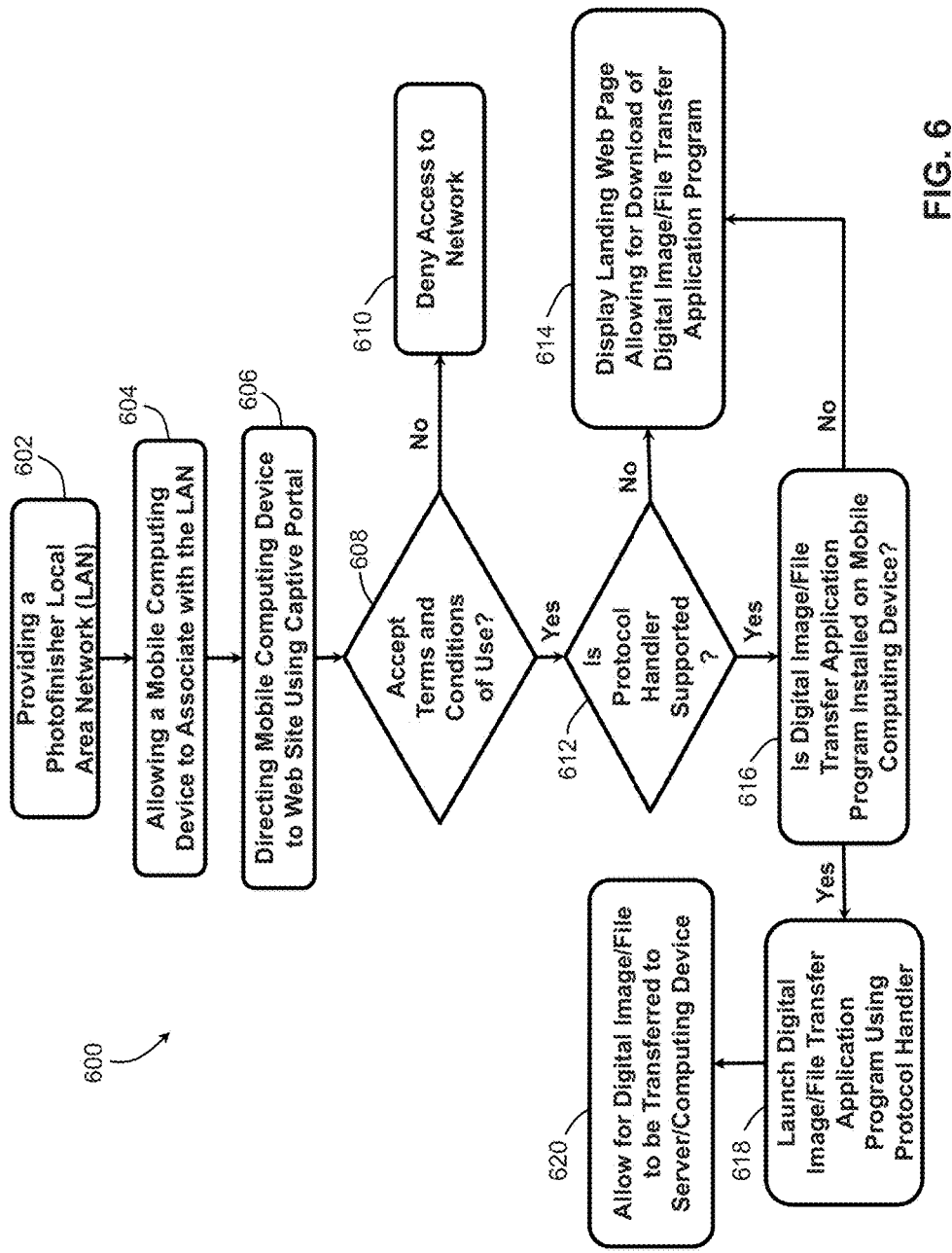
FIG. 6 is a flow diagram showing an alternative method in accordance with the aspect of the invention shown in FIG. 4.

It should be understood that the photo-related application program may also be an image/file transfer application program that allows for a digital photo, a file, or the print order to be transferred from mobile device 114 for storage in a remote photofinisher server 444 or a local photofinisher server, or communicated to another computing device 104, 106 through network 102. As best seen in FIGS. 4 and 6, the steps 602-614 are similar to steps 502-514 described above with respect to the method in FIG. 5. However, in step 616, the detection module determines whether the image/file transfer application program is stored on mobile device 114. If so, at step 618, the launch module operates to launch image/file transfer application program 440 on mobile device 114 using protocol handler 130. Once image/file transfer application program 440 is launched on mobile device 114, at step 620, the system and method allows for the a digital photo, a file, or the print order to be transferred from mobile device 114 to a remote photofinisher server 444 or a local photofinisher server included within or in communication with photofinisher device 438 for storage on the respective server, or to another computing device 104, 106.

In accordance with the above-referenced aspects of the present invention, an advantageous system and method have been provided to leverage a customer's mobile device when it is used to access a LAN, such as a WiFi network, in a given store location. Prior to allowing general access to the Internet using the LAN, the photo fulfillment center directs the customer's mobile device to a photo printing application program that is specific to the business of the photo fulfillment center to encourage the customer to purchase print products and allow for advertising of certain types of print products while the customers are physically present in the store location. The system and method also provides the ability to launch an application program on the mobile device to allow for digital images, files, or a print order to be transferred and/or stored in a local or remote photofinisher server, or transferred to a remote computing device through a network. These advantages are realized with the system and methods described herein, and other advantages are realized as well.

In another aspect of the present invention, a time correlation of the launch of the application program relative to an associated service computing device, such as a kiosk, may be used to automatically establish a connection between the mobile device and the kiosk. In this system, if there were only a single mobile device seeking services of the photofinishing device, such as a kiosk/host, and only a single photofinishing device (e.g., kiosk/host) seeking information from a mobile device, they would automatically be associated and connected with one another. This eliminates the need to utilize a "pairing code" to ensure the two devices are communicating and no other devices are interfering with a specific shopping experience. Once this pairing has occurred, another pair (mobile device and kiosk) may subsequently use this process. Only when multiple mobile devices and/or multiple kiosks/hosts are simultaneously seeking connections would a manual pairing process be required.

Having described the system and method of the present invention and an embodiment thereof, an exemplary computer environment for implementing the described design and execution is presented next.

Figure 7:
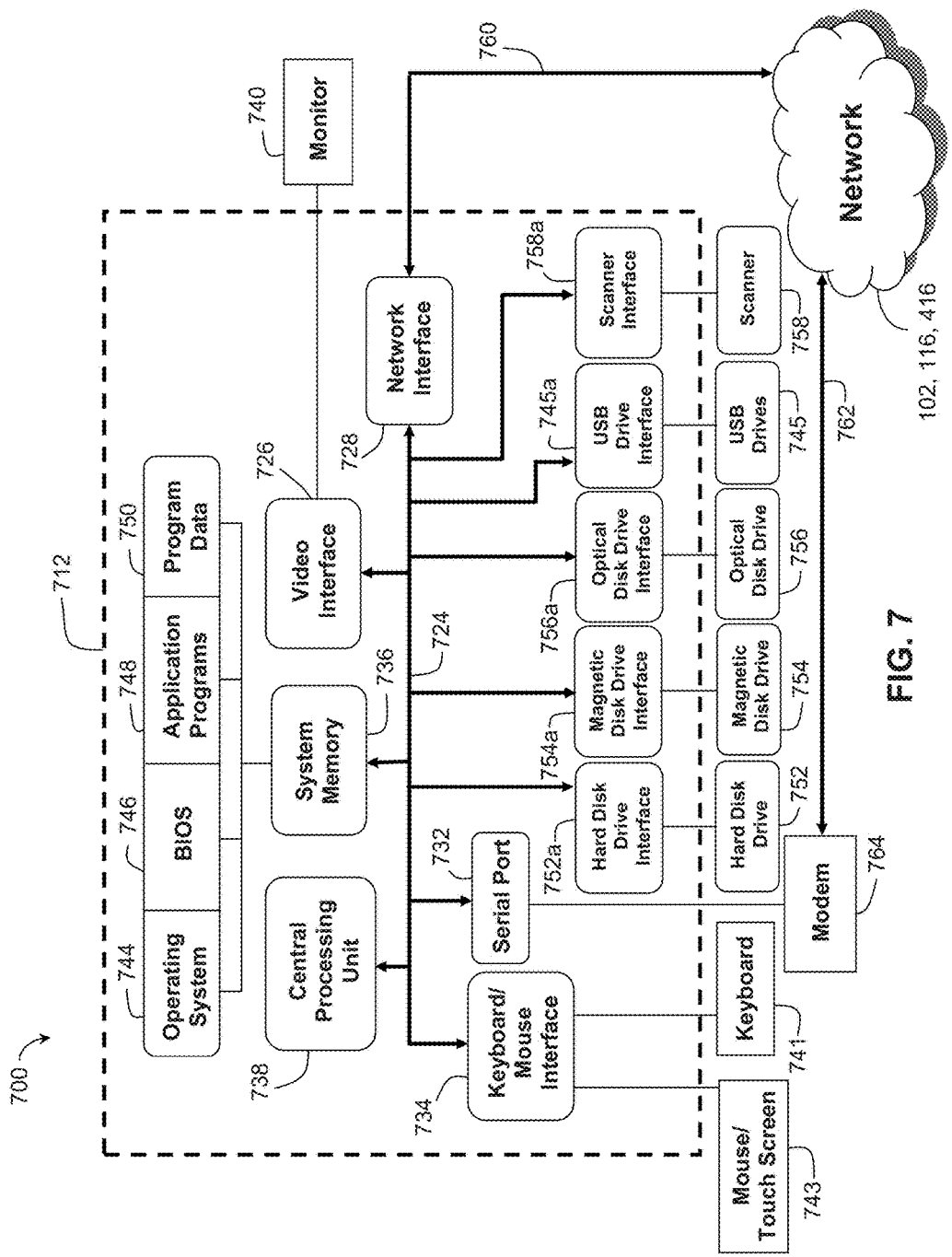
FIG. 7 is a block diagram generally illustrating a computing environment in which the invention may be implemented.

FIG. 7 shows an exemplary computing environment 700 that can be used to implement any of the processing thus far described. Computing environment 700 may include one or more computers 712 (such as, for example, computing devices 104, 106, 114, 438, 444) comprising a system bus 724 that couples a video interface 726, network interface 728, a keyboard/mouse interface 734, and a system memory 736 to a Central Processing Unit (CPU) 738. A monitor or display 740 is connected to bus 724 by video interface 726 and provides the user with a graphical user interface to view, edit, and prepare an order, such as, for example, using digitally represented still images. The graphical user interface allows the user to enter commands and information into computer 712 using a keyboard 741 and a user interface selection device 743, such as a mouse, touch screen, or other pointing device. Keyboard 741 and user interface selection device are connected to bus 724 through keyboard/mouse interface 734. The display 740 and user interface selection device 743 are used in combination to form the graphical user interface which allows the user to implement at least a portion of the present invention. Other peripheral devices may be connected to the remote computer through universal serial bus (USB) drives 745 to transfer information to and from computer 712. For example, cameras and camcorders may be connected to computer 712 through serial port 732 or USB drives 745 so that data representative of a digitally represented still image, text, music, video, or other digital content may be downloaded to system memory 736 or another memory storage device associated with computer 712 such that the images may be subsequently printed by photofinisher device 438 in accordance with the present invention.

The system memory 736 is also connected to bus 724 and may include read only memory (ROM), random access memory (RAM), an operating system 744, a basic input/output system (BIOS) 746, application programs 748 and program data 750. The computer 712 may further include a hard disk drive 752 for reading from and writing to a hard disk, a magnetic disk drive 754 for reading from and writing to a removable magnetic disk (e.g., floppy disk), and an optical disk drive 756 for reading from and writing to a removable optical disk (e.g., CD ROM or other optical media). The computer 712 may also include USB drives 745 and other types of drives for reading from and writing to flash memory devices (e.g., compact flash, memory stick/PRO and DUO, SD card, multimedia card, smart media xD card), and a scanner 758 for scanning items such as still image photographs to be downloaded to computer 512. A hard disk drive interface 752*a*, magnetic disk drive interface 754*a*, an optical drive interface 756*a*, a USB drive interface 745*a*, and a scanner interface 758*a* operate to connect bus 724 to hard disk drive 752, magnetic disk drive 754, optical disk drive 756, USB drive 745 and scanner 758, respectively. Each of these drive components and their associated computer-readable media may provide computer 712 with non-volatile storage of computer-readable instruction, program modules, data structures, application programs, an operating system, and other data for computer 712. In addition, it will be understood that computer 712 may also utilize other types of computer-readable media in addition to those types set forth herein, such as digital video disks, random access memory, read only memory, other types of flash memory cards, magnetic cassettes, and the like.

Computer 712 may operate in a networked environment using logical connections with network 102, 116, 416. Network interface 728 provides a communication path 760 between bus 724 and network 102, 116, 416, which allows, for example, a print order to be communicated to photofinisher device 438. The print order, for example, may also be communicated from bus 724 through a communication path 762 to network 102, 116, 416 using serial port 732 and a modem 764. It will be appreciated that the network connections shown herein are merely exemplary, and it is within the scope of the present invention to use other types of network connections between computer 712 and network 102, 116, 416 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A system for automatically launching an application program stored in a memory of a mobile computing device upon associating the mobile computing device with a local area network, the system comprising:
   a WiFi device providing a wireless network in an area, wherein the WiFi device receives a request to join the wireless network from a mobile computing device when the mobile computing device is in the area, wherein the WiFi device selectively allows the mobile computing device access to the wireless network, and wherein the wireless network is provided by a business entity;
   a web application server including a memory, wherein the web application server is in communication with the WiFi device;
   a user agreement module stored in the memory of the web application server, wherein when the WiFi device receives the request to join the wireless network from the mobile computing device, the user agreement module displays terms and conditions of use on the mobile computing device and provides the ability for the mobile computing device to accept the displayed terms and condition, and wherein the WiFi device allows the mobile computing device access to the wireless network after the acceptance of the terms and conditions;
   a detection module stored in the memory of the web application server, wherein when the terms and conditions are accepted and the mobile computing device is located in the area of the wireless network, the detection module detects whether the mobile computing device supports a protocol handler, and when the mobile computing device supports the protocol handler automatically determines if an application program is stored in the memory of the mobile computing device, wherein the application program is pre-identified by the business entity that provides the wireless network; and
   a launch module stored in the memory of the web application server, wherein when the detection module automatically determines that the application program is stored in the memory of the mobile computing device, the launch module uses the protocol handler to automatically launch the application program on the mobile computing device when the mobile computing device is located in the area of the wireless network, wherein the application program displays content on the mobile computing device, and wherein the content is related to the business entity.

2. The system in accordance with claim 1, wherein the launch module includes the protocol handler.

3. The system in accordance with claim 1, wherein the user agreement module displays the terms and conditions of use on a web page stored in the web application server.

4. The system in accordance with claim 1, further comprising a business entity computing system including the local area network and the web application server.

5. A system for automatically launching a photo printing application program stored in a memory of a mobile computing device upon associating the mobile computing device with a local area network, the system comprising:
a WiFi device providing a wireless photofinisher network in an area, wherein the WiFi device receives a request to join the wireless photofinisher network from a mobile computing device when the mobile computing device is in the area, wherein the WiFi device allows the mobile computing device access to the wireless photofinisher network, and wherein the wireless photofinisher network is provided by a business entity;
a photofinisher device in communication with the wireless photofinisher network, wherein the photofinisher device receives a print order from the mobile computing device over the wireless photofinisher network using a photo printing application program and fulfills the print order utilizing a printing device;
a web application server including a memory;
a user agreement module stored in the memory of the web application server, wherein when the WiFi device receives the request to join the wireless photofinisher network from the mobile computing device, the user agreement module displays terms and conditions of use on the mobile computing device and provides the ability for the mobile computing device to accept the displayed terms and conditions, and wherein the WiFi device allows the mobile computing device access to the wireless photofinisher network after the acceptance of the terms and conditions;
a detection module stored in the memory of the web application server, wherein when the terms and conditions are accepted and the mobile computing device is located in the area of the wireless photofinisher network, the detection module detects whether the mobile computing device supports a protocol handler, and when the mobile computing device supports the protocol handler automatically determines if the photo printing application program is stored in the memory of the mobile computing device, wherein the photo printing application program is pre-identified by the business entity that provides the wireless photofinisher network; and
a launch module stored in the memory of the web application server, wherein when the detection module automatically determines that the photo printing application program is stored in the memory of the mobile computing device, the launch module uses the protocol handler to automatically launch the photo printing application program on the mobile computing device when the mobile computing device is located in the area of the wireless photofinisher network, wherein the photo printing application program displays content on the mobile computing device, and wherein the content is related to the business entity,
wherein the photo printing application program allows the print order to be generated including a digital photograph selected using the mobile computing device, and wherein the print order is communicated to the photofinisher device over the wireless photofinisher network for generating a print product based upon the digital photograph.

6. The system in accordance with claim 5, wherein the photofinisher device is a kiosk.

7. The system in accordance with claim 5, further comprising a photofinisher server that stores the print order and communicating the print order to the printing device.

8. The system in accordance with claim 5, wherein the launch module includes the protocol handler.

9. The system in accordance with claim 5, wherein the user agreement module displays the terms and conditions of use on a web page stored in the web application server.

10. The system in accordance with claim 5, further comprising a business entity computing system including the local area network and the web application server.

11. A method programmed for execution in a computing environment for launching an application program stored in a memory of a mobile computing device, the method comprising:
providing a wireless local area network in an area, wherein the wireless local area network is provided by a business entity;
pre-identifying an application program by the business entity that provides the wireless network;
allowing a mobile computing device to associate with the wireless local area network when the mobile computing device is located in the area;
providing a web page for display on the mobile computing device including terms and conditions of use of the wireless local area network when the mobile computing device is associated with the wireless local area network;
allowing for an acceptance of the displayed terms and conditions of use of the wireless local area network using the mobile computing device, wherein access to the wireless local area network is enabled after the acceptance of the terms and conditions of use;
if the displayed terms and conditions of use of the wireless local area network are accepted and the mobile computing device is located in the area of the wireless local area network, detecting whether the mobile computing device supports a protocol handler, and when the mobile computing device supports the protocol handler providing for the automatic detection of the application program in the memory of the mobile computing device; and
if the application program is detected in the memory of the mobile computing device, using the protocol handler to automatically launch the application program on the mobile computing device when the mobile computing device is located in the area of the wireless local area network, wherein the application program displays content on the mobile computing device, and wherein the content is related to the business entity.

12. A method in accordance with claim 11, wherein the web page is provided for display on the mobile computing device using a captive portal.

13. A method in accordance with claim 11, wherein if the application program is not detected in the memory of the mobile computing device, then the method comprises the step of directing the mobile computing device to a landing web page that allows for the download of the application program by the mobile computing device.

14. A method in accordance with claim 11, wherein the content is information related to at least one of a coupon offer, access to a pre-paid account with the business entity, or a map.

15. A method in accordance with claim 11, wherein the web page is provided by a business entity computing system.

16. A method programmed for execution in a computing environment for launching a photo printing application program stored in a memory of a mobile computing device, the method comprising:
  providing a wireless local area network in an area, wherein the wireless local area network is in communication with a photofinishing device, and wherein the wireless local area network is provided by a business entity;
  pre-identifying a photo printing application program by the business entity that provides the wireless local area network;
  allowing a mobile computing device to associate with the wireless local area network when the mobile computing device is located in the area;
  providing a web page for display on the mobile computing device including terms and conditions of use for the wireless local area network when the mobile computing device is associated with the wireless local area network;
  allowing for an acceptance of the displayed terms and conditions of use of the wireless local area network using the mobile computing device, wherein access to the wireless local area network is enabled after the acceptance of the terms and conditions of use;
  if the displayed terms and conditions of use of the wireless local area network are accepted and the mobile computing device is located in the area of the wireless local area network, detecting whether the mobile computing device supports a protocol handler, and when the mobile computing device supports the protocol handler providing for the automatic detection of the photo printing application program in the memory of the mobile computing device;
  if the photo printing application program is automatically detected in the memory of the mobile computing device, using the protocol handler to automatically launch the photo printing application program on the mobile computing device when the mobile computing device is located in the area of the wireless local area network, wherein the photo printing application program displays content using the mobile computing device, and wherein the content is related to the business entity; and
  providing for the generation of a print order including a digital photograph selected using the mobile computing device,
  wherein the photofinisher device receives the print order from the mobile computing device over the wireless local area network and fulfilling the print order utilizing a printing device.

17. A method in accordance with claim 16, wherein the web page is provided for display on the mobile computing device using a captive portal.

18. A method in accordance with claim 16, wherein if the photo printing application program is not detected in the memory of the mobile computing device, then the method comprises the step of directing the mobile computing device to a landing web page that allows for the download of the photo printing application program by the mobile computing device.

19. A method in accordance with claim 16, wherein the business entity is a photo fulfillment center.

20. A method in accordance with claim 16, wherein the web page is provided by a business entity computing system.

21. A system for launching an image/file transfer application program stored in a memory of a mobile computing device upon associating the mobile computing device with a local area network, the system comprising:
  a WiFi device providing a wireless network in an area, wherein the WiFi device receives a request to join the wireless network from a mobile computing device when the mobile computing device is in the area, wherein the WiFi device selectively allows the mobile computing device access to the wireless network, and wherein the wireless network is provided by a business entity;
  a web application server including a memory, wherein the web application server is in communication with the WiFi device;
  a user agreement module stored in the memory of the web application server, wherein when the WiFi device receives the request to join the wireless network from the mobile computing device, the user agreement module displays terms and conditions of use on the mobile computing device and provides the ability for the mobile computing device to accept the displayed terms and conditions, and wherein the WiFi device allows the mobile computing device access to the wireless network after the acceptance of the terms and conditions;
  a detection module stored in the memory of the web application server, wherein when the terms and conditions are accepted and the mobile computing device is located in the area of the wireless network, the detection module detects whether the mobile computing device supports a protocol handler, and when the mobile computing device supports the protocol handler automatically determines if an image/file transfer application program is stored in the memory of the mobile computing device, wherein the image/file transfer application program is pre-identified by the business entity that provides the wireless network; and
  a launch module stored in the memory of the web application server, wherein when the detection module automatically determines that the image/file transfer application program is stored in the memory of the mobile computing device, the launch module uses the protocol handler to automatically launch the image/file transfer application program on the mobile computing device when the mobile computing device is located in the area of the wireless network, wherein the image/file application program displays content on the mobile computing device, and wherein the content is related to the business entity,
  wherein the image/file transfer application program allows a digital photograph that is stored on the mobile computing device to be communicated to another computing device using the wireless network.

22. The system in accordance with claim 21, further comprising a business entity computing system including the local area network and the web application server.

23. A method programmed for execution in a computing environment for launching an image/file transfer application program stored in a memory of a mobile computing device, the method comprising:
  providing a wireless local area network in an area, wherein a computing device remote is in communication with a mobile computing device over the wireless local area network, and wherein the wireless local area network is provided by a business entity;

allowing the mobile computing device to associate with the wireless local area network when the mobile computing device is located in the area;

providing a web page for display on the mobile computing device including terms and conditions of use for the wireless local area network when the mobile computing device is associated with the wireless local area network;

allowing for an acceptance of the displayed terms and conditions of use of the wireless local area network using the mobile computing device, wherein access to the wireless local area network is enabled after the acceptance of the terms and conditions of use;

if the displayed terms and conditions of use of the wireless local area network are accepted and the mobile computing device is located in the area of the wireless local area network, detecting whether the mobile computing device supports a protocol handler, and when the mobile computing device supports the protocol handler providing for the automatic detection of an image/file transfer application program in the memory of the mobile computing device, wherein the image/file transfer application program is pre-identified by the business entity that provides the wireless network;

if the image/file transfer application program is automatically detected in the memory of the mobile computing device, using the protocol handler to automatically launch the image/file transfer application program on the mobile computing device when the mobile computing device is located in the area of the wireless local area network, wherein the image/file transfer application program is configured for displaying content using the mobile computing device, and wherein the content is related to the business entity; and allowing the mobile computing device to communicate a digital image that is stored on the mobile computing device to the remote computing device using the wireless local area network.

24. A method in accordance with claim 23, wherein the web page is provided by a business entity computing system.

* * * * *